(12) United States Patent
Kirchhoff et al.

(10) Patent No.: US 8,774,785 B1
(45) Date of Patent: Jul. 8, 2014

(54) METHODS AND SYSTEMS FOR BLOCKING UNWANTED COMMUNICATIONS

(71) Applicant: Callwave Communications, LLC, Santa Barbara, CA (US)

(72) Inventors: Leland W. Kirchhoff, Santa Barbara, CA (US); Colin Kelley, Santa Barbara, CA (US); David S. Trandal, Santa Barbara, CA (US); David F. Hofstatter, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

(21) Appl. No.: 14/103,630

(22) Filed: Dec. 11, 2013

Related U.S. Application Data

(63) Continuation of application No. 14/042,065, filed on Sep. 30, 2013, which is a continuation of application No. 11/866,250, filed on Oct. 2, 2007, now Pat. No. 8,548,447.

(60) Provisional application No. 60/850,044, filed on Oct. 6, 2006, provisional application No. 60/900,534, filed on Feb. 9, 2007.

(51) Int. Cl.
*H04M 3/42* (2006.01)
*H04B 1/38* (2006.01)

(52) U.S. Cl.
USPC ...................................... 455/415; 379/210.02

(58) Field of Classification Search
CPC .. H04M 1/663; H04M 3/436; H04L 65/1076; H04L 65/1079
USPC ............. 455/415, 417, 445, 565; 379/210.02, 379/210.03, 211.01
See application file for complete search history.

(56) References Cited

U.S. PATENT DOCUMENTS

| | | | |
|---|---|---|---|
| 3,936,613 | A | 2/1976 | Nishigori et al. |
| 3,956,595 | A | 5/1976 | Sobanski |

(Continued)

FOREIGN PATENT DOCUMENTS

| | | |
|---|---|---|
| CA | 1329852 | 9/1989 |
| EP | 1 120 954 | 8/2001 |

(Continued)

OTHER PUBLICATIONS

Johnson, Dave; Article; "Now You're Talking—voice—response systems for home offices—Product Information"; http://www.findarticles.com; Feb. 1999.

(Continued)

*Primary Examiner* — Wesley Kim
(74) *Attorney, Agent, or Firm* — Knobbe, Martens, Olson & Bear LLP

(57) ABSTRACT

Methods and systems are described for processing call blocking instructions and for managing mobile messaging. A method of processing call blocking instructions is described. A call processing system receives a call from a caller intended for a first user. A notification regarding the call is transmitted to a mobile device associated with the first user. A message from the user is received via the mobile device, wherein the message is a text or multimedia type message. At least partly in response to the message, the caller is placed on a blacklist indicating that future calls from the caller to the user are to be blocked.

16 Claims, 11 Drawing Sheets

(56) References Cited

U.S. PATENT DOCUMENTS

| | | |
|---|---|---|
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,361,295 A | 11/1994 | Solomon et al. |
| 5,384,831 A | 1/1995 | Creswell et al. |
| 5,404,537 A | 4/1995 | Olnowich et al. |
| 5,434,908 A | 7/1995 | Klein |
| 5,440,620 A | 8/1995 | Slusky |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |
| 5,548,636 A | 8/1996 | Bannister et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,862,208 A | 1/1999 | MeLampy et al. |
| 5,894,504 A | 4/1999 | Alfred et al. |
| 5,912,948 A | 6/1999 | Nelson et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,991,367 A | 11/1999 | Robuck |
| 5,995,594 A | 11/1999 | Shaffer et al. |
| 5,995,603 A | 11/1999 | Anderson |
| 5,999,806 A | 12/1999 | Kaplan et al. |
| 6,014,436 A | 1/2000 | Florence et al. |
| 6,023,503 A | 2/2000 | Schneider et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,041,103 A | 3/2000 | La Porta et al. |
| 6,044,059 A | 3/2000 | Olnowich |
| 6,055,430 A | 4/2000 | Cooper et al. |
| 6,078,581 A | 6/2000 | Shtivelman et al. |
| 6,100,873 A | 8/2000 | Bayless et al. |
| 6,101,249 A | 8/2000 | Weber |
| 6,104,800 A | 8/2000 | Benson |
| 6,144,644 A | 11/2000 | Bajzath et al. |
| 6,154,646 A | 11/2000 | Tran et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,292,478 B1 | 9/2001 | Farris |
| 6,304,565 B1 | 10/2001 | Ramamurthy |
| 6,310,939 B1 | 10/2001 | Varney |
| 6,337,898 B1 | 1/2002 | Gordon |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,381,459 B1 | 4/2002 | Gervens et al. |
| 6,405,035 B1 | 6/2002 | Singh |
| 6,408,177 B1 | 6/2002 | Parikh et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,539,084 B1 | 3/2003 | Long |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,690,785 B1 | 2/2004 | Stelter et al. |
| 6,748,058 B1 | 6/2004 | Schwend et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,804,334 B1 * | 10/2004 | Beasley et al. ............. 379/88.17 |
| 6,857,074 B2 | 2/2005 | Bobo, II |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,035,385 B2 | 4/2006 | Levine et al. |
| 7,103,167 B2 | 9/2006 | Brahm et al. |
| 7,113,768 B2 | 9/2006 | Hundscheidt et al. |
| 7,116,972 B1 | 10/2006 | Zhang et al. |
| 7,120,455 B1 | 10/2006 | Chen et al. |
| 7,209,964 B2 | 4/2007 | Dugan et al. |
| 7,231,029 B1 | 6/2007 | Kirkpatrick |
| 7,254,219 B1 | 8/2007 | Hansen et al. |
| 7,263,178 B1 | 8/2007 | Brothers et al. |
| 7,283,829 B2 | 10/2007 | Christenson et al. |
| 7,382,773 B2 | 6/2008 | Schoeneberger et al. |
| 7,388,949 B2 | 6/2008 | Contractor et al. |
| 7,397,910 B2 | 7/2008 | Dolan et al. |
| 7,412,050 B2 | 8/2008 | Renner et al. |
| 7,460,653 B2 | 12/2008 | Brahm et al. |
| 7,474,432 B1 | 1/2009 | Kirchhoff et al. |
| 7,480,065 B1 | 1/2009 | Trandal et al. |
| 7,522,580 B2 | 4/2009 | Miller et al. |
| 7,548,756 B2 | 6/2009 | Velthuis et al. |
| 7,555,110 B2 | 6/2009 | Dolan et al. |
| 7,636,428 B2 | 12/2009 | Brahm et al. |
| 7,688,958 B2 | 3/2010 | Dolan et al. |
| 7,738,479 B2 | 6/2010 | Ruckart |
| 7,742,586 B1 | 6/2010 | Trandal et al. |
| 7,822,188 B1 | 10/2010 | Kirchhoff et al. |
| 8,000,455 B1 | 8/2011 | Van Haaften et al. |
| 8,081,740 B2 | 12/2011 | Reynolds et al. |

(56) References Cited

U.S. PATENT DOCUMENTS

| | | | |
|---|---|---|---|
| 8,218,736 B1 | 7/2012 | McClintock et al. | |
| 8,457,293 B1 | 6/2013 | Trandal et al. | |
| 8,472,592 B1 | 6/2013 | Van Haaften et al. | |
| 8,472,604 B2 | 6/2013 | Brahm et al. | |
| 2002/0010616 A1 | 1/2002 | Itzhaki | |
| 2002/0035616 A1 | 3/2002 | Diamond et al. | |
| 2002/0097710 A1 | 7/2002 | Burg | |
| 2003/0021403 A1* | 1/2003 | Jones | 379/210.02 |
| 2003/0039339 A1 | 2/2003 | Luehrig et al. | |
| 2003/0063731 A1 | 4/2003 | Woodring | |
| 2003/0123629 A1 | 7/2003 | Hussain et al. | |
| 2003/0156700 A1 | 8/2003 | Brown et al. | |
| 2003/0191823 A1 | 10/2003 | Bansal et al. | |
| 2003/0215078 A1 | 11/2003 | Brahm et al. | |
| 2004/0028203 A1 | 2/2004 | Wurster et al. | |
| 2004/0066926 A1 | 4/2004 | Brockbank et al. | |
| 2004/0073566 A1 | 4/2004 | Trivedi | |
| 2004/0105536 A1 | 6/2004 | Williams | |
| 2004/0120478 A1 | 6/2004 | Reynolds et al. | |
| 2004/0141598 A1 | 7/2004 | Moss et al. | |
| 2004/0190706 A1 | 9/2004 | Fleischer, III et al. | |
| 2004/0218743 A1 | 11/2004 | Hussain et al. | |
| 2004/0240641 A1 | 12/2004 | Cohen et al. | |
| 2004/0247105 A1 | 12/2004 | Mullis et al. | |
| 2004/0249650 A1 | 12/2004 | Freedman et al. | |
| 2004/0258220 A1 | 12/2004 | Levine et al. | |
| 2005/0010573 A1 | 1/2005 | Garg | |
| 2005/0053216 A1 | 3/2005 | Spencer et al. | |
| 2005/0078612 A1 | 4/2005 | Lang | |
| 2005/0119019 A1 | 6/2005 | Jang | |
| 2005/0123118 A1 | 6/2005 | Terry et al. | |
| 2005/0129206 A1* | 6/2005 | Martin | 379/211.01 |
| 2005/0143106 A1 | 6/2005 | Chan et al. | |
| 2005/0154599 A1 | 7/2005 | Kopra et al. | |
| 2005/0186950 A1 | 8/2005 | Jiang | |
| 2005/0198389 A1 | 9/2005 | LaSalle et al. | |
| 2005/0207556 A1 | 9/2005 | Gonzalez et al. | |
| 2005/0246193 A1 | 11/2005 | Roever et al. | |
| 2005/0265322 A1 | 12/2005 | Hester | |
| 2005/0286498 A1 | 12/2005 | Rand et al. | |
| 2005/0287993 A1 | 12/2005 | Gogic | |
| 2006/0013374 A1 | 1/2006 | Fleischer, III et al. | |
| 2006/0063541 A1 | 3/2006 | Ryu | |
| 2006/0135219 A1* | 6/2006 | Kim et al. | 455/573 |
| 2006/0142012 A1 | 6/2006 | Kirchhoff et al. | |
| 2006/0199572 A1 | 9/2006 | Chin et al. | |
| 2006/0205392 A1 | 9/2006 | Jagadeesan et al. | |
| 2006/0239429 A1 | 10/2006 | Koch et al. | |
| 2006/0268007 A1 | 11/2006 | Gopalakrishnan | |
| 2007/0002077 A1 | 1/2007 | Gopalakrishnan | |
| 2007/0004411 A1 | 1/2007 | Goldman et al. | |
| 2007/0036286 A1 | 2/2007 | Champlin et al. | |
| 2007/0067738 A1 | 3/2007 | Flynt et al. | |
| 2007/0123280 A1 | 5/2007 | McGary et al. | |
| 2007/0143422 A1* | 6/2007 | Cai | 709/206 |
| 2007/0153999 A1 | 7/2007 | Daigle | |
| 2007/0155369 A1* | 7/2007 | Jobs et al. | 455/414.1 |
| 2007/0160188 A1 | 7/2007 | Sharpe et al. | |
| 2007/0178919 A1 | 8/2007 | Huggett et al. | |
| 2007/0202898 A1 | 8/2007 | Bae et al. | |
| 2007/0233795 A1 | 10/2007 | Setlow et al. | |
| 2007/0238443 A1* | 10/2007 | Richardson | 455/411 |
| 2008/0008105 A1 | 1/2008 | Black et al. | |
| 2008/0219424 A1 | 9/2008 | Moss et al. | |
| 2008/0280644 A1 | 11/2008 | Hugot | |
| 2008/0298574 A1* | 12/2008 | Koch | 379/210.02 |
| 2009/0052644 A1 | 2/2009 | Wood et al. | |
| 2009/0052647 A1 | 2/2009 | Wood et al. | |
| 2009/0100027 A1 | 4/2009 | Malik | |
| 2009/0239504 A1 | 9/2009 | Turk | |
| 2010/0202601 A1 | 8/2010 | Frank | |

FOREIGN PATENT DOCUMENTS

| | | | |
|---|---|---|---|
| EP | 1775922 A1 * | 4/2007 | H04M 1/663 |
| JP | 10-513632 | 12/1998 | |
| JP | 11-506292 | 6/1999 | |
| JP | 2001-168989 | 6/2001 | |
| WO | WO 97/26749 | 7/1997 | |
| WO | WO 00 60840 | 10/2000 | |
| WO | WO 01/76210 | 10/2001 | |

OTHER PUBLICATIONS

Article: "Widget MySpace Widget"; posted by 4INFO Bob; htto://4info.typepad.com/blog/2006/09/widget_myspace_.html; Sep. 15, 2006; 3 pages.

Article: Communications-SMS, Dashboard Widgets—Showcase; http://www.dashboardwidgets.com/showcase/details.php?wid=1082; Oct. 14, 2005; 2 pages.

* cited by examiner

*callwave*

Free Text Messages

Send free text messages anywhere - just fill in the form below, and hit "Send"

Enter Your Information

Cell Number:
Carrier: Select Carrier ▶
Email:

Replies to: ● Your Phone ○ Your Email (cannot be used for International recipients)

Enter Your Friend's Information

Cell Number:
Carrier: Select Carrier ▶
Message:

Send      Help

*FIG. 12*

METHODS AND SYSTEMS FOR BLOCKING UNWANTED COMMUNICATIONS

CROSS-REFERENCE TO RELATED APPLICATIONS

This application is a continuation of U.S. patent application Ser. No. 14/042,065 filed Sep. 30, 2013, which is a continuation of U.S. patent application Ser. No. 11/866,250, filed Oct. 2, 2007, now U.S. Pat. No. 8,548,447, which claims priority from U.S. Patent Application No. 60/850,044, filed Oct. 6, 2006, and U.S. Patent Application No. 60/900,534, filed Feb. 9, 2007, the contents of which are incorporated herein by reference in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for presenting and responding to calls and messages.

2. Description of the Related Art

Conventionally, Short Message Service (SMS) or Multi-Media Message Service (MMS) is used for sending call and message notifications to subscriber mobile phones. When the call processing system is configured for SMS/MMS notifications, the subscriber specifies the mobile phone number to be notified and the call processing system then determines the associated Mobile Network Operator (MNO) and routes SMS/MMS notifications to the known operator or a gateway provider for the known operator using a message transport protocol such as SMTP (Simple Message Transport Protocol) or SMPP (Short Message Peer-to-Peer protocol). The MNO or Gateway converts the notification message to a SM, if required, and routes the message to the subscriber's phone via their Short Message Service Center (SMSC).

SUMMARY OF THE INVENTION

Methods and systems are described for processing call blocking instructions and for managing mobile messaging.

An example embodiment provides a method of processing a call blocking instruction, the method comprising: receiving at a call processing system a call from a caller intended for a first user; transmitting a notification regarding the call to a mobile device associated with the first user; receiving a message from the first user via the mobile device, wherein the message is a text or multimedia type message; and at least partly in response to the message, recording in memory an indication that future communications of at least a first type from the caller to the first user are to be blocked.

An example embodiment provides a method of processing user designations provided via a call log user interface, the method comprising: providing a user interface in the form of a call log that includes at least a partial listing of calls directed to at least a first phone address associated with a user; providing a control via which the user can designate an entry in the call log to be blacklisted; storing in memory a blacklist designation for a first entry in the call log provided by the user via the control, wherein the first entry is associated with a caller phone address; and not connecting a first call originating from the caller phone address to at least the first phone address at least partly in response to the blacklist designation.

An example embodiment provides a method of processing call blocking instructions, the method comprising: providing a control via which a first user can designate a party associated with a contact record in a first user contact data store to be blacklisted; storing in memory a blacklist designation for a first contact record provided by the first user via the control, wherein the first contact record is associated with a first party and a first party phone address; and not connecting a first call from the first party phone address to a first user phone address at least partly in response to the blacklist designation.

An example embodiment provides a method of storing messages, comprising: receiving over a network at a message processing system a first message from a first user intended for a recipient, wherein the first message is a Short Message Service message or a Multimedia Message Service message; storing the message, including the message content, the message date, and a recipient identifier, in memory in association with an account of the first user; providing the message to a first system that wirelessly transmits the message to a mobile phone; providing an archive message control to the user; and at least partly in response to the user activating the archive control, causing at least a portion of archived messages to be displayed, the archived messages including the first message.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 12 illustrates an example web page used to send text messages.

DETAILED DESCRIPTION OF PREFERRED EMBODIMENTS

Figure 1:
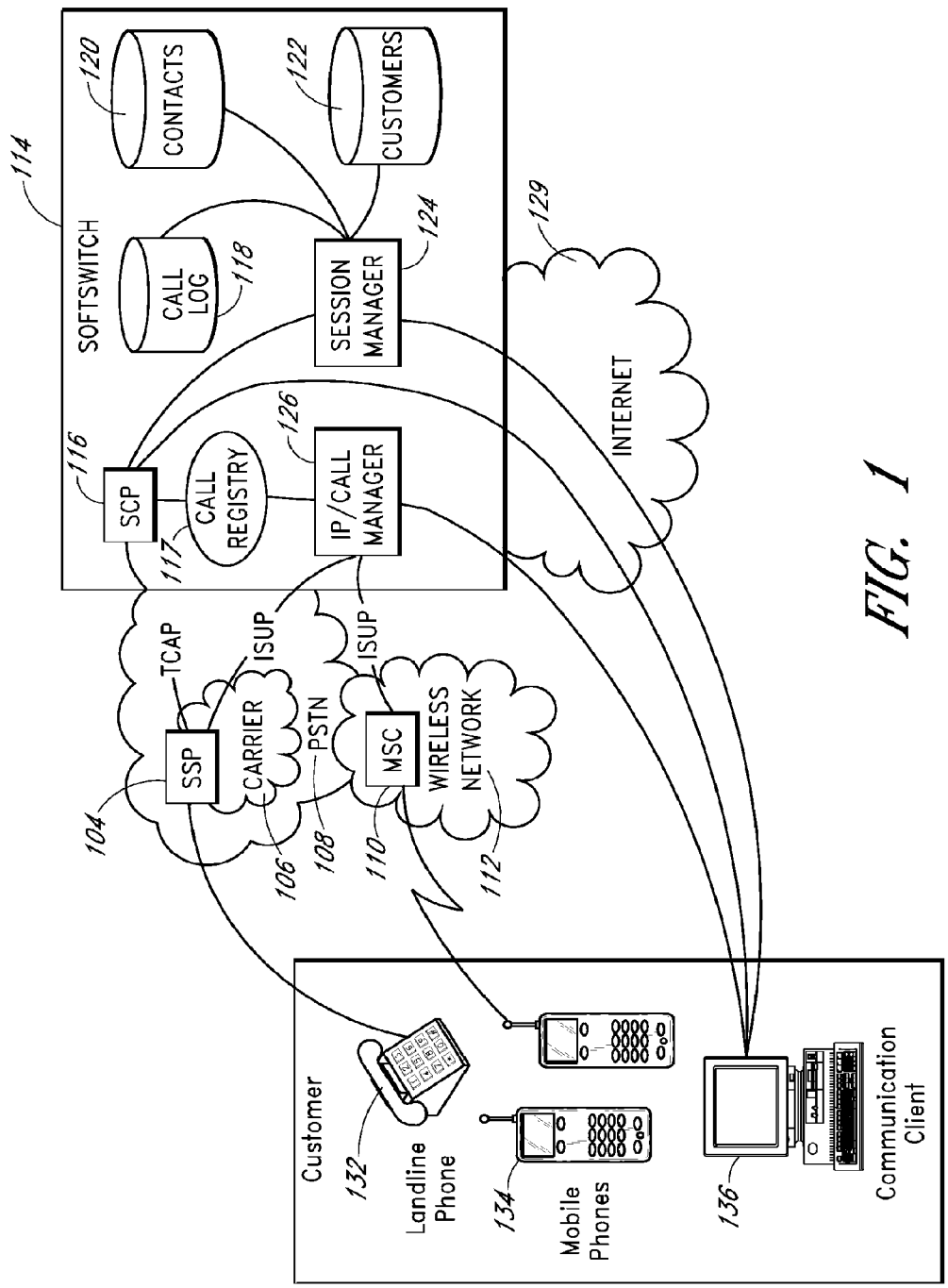
FIG. 1 illustrates an example network operating environment for advanced telecommunications services

The present invention is related to telecommunications, and in particular, to methods and systems for presenting and responding to calls and messages.

Described herein are methods and systems that enable a service provider to offer services that allow subscribers to create "blacklists" (e.g., a list or other type of register of people or entities from whom calls and/or messages, such as SMS or MMS messages, are not to be transmitted to a subscriber). In an example embodiment, a subscriber can add an entry to a blacklist by, for example, replying to a notifications received on a telecommunications device (e.g., an SMS or MMS call notification received on a wireless phone), marking as blacklisted (to be blocked) a contact in a contact list presented via a telecommunication client, a web site, or otherwise, and/or by so designating a call log entry in a call list (e.g., of calls previously placed to or from the subscriber) as a blocked/blacklisted caller.

In an example embodiment, a telecommunications system provides additional value to telephone (e.g., wireless, wireline, and/or VoIP) network customers (subscribers/users) by enabling them to respond to a message (e.g., a text and/or multimedia message, such as an SMS or MMS message) which causes the caller/message sender to be placed on a list, such as a blacklist stored in computer readable memory (e.g., in a database or other data store). Once on a blacklist, calls to the subscriber can optionally be rejected with a rejection notification provided to the caller, such as, by way of example: a) busy tone, b) a system voice announcement message, c) a greeting (or other notification) recorded by the subscriber, or d) otherwise.

Optionally, the customer and/or a system operator can specify on a global basis or on an individual caller basis the treatment of calls received from callers on the blacklist (e.g., what tone, message, or greeting is to be played to the caller) via a telecommunications client application, a Web site that provides user interfaces for account configuration, or otherwise. The default call treatment can be specified by the system operator or the customer, and the customer can identify blacklisted individuals that are to receive a different customer-specified call treatment. For example, the playing of a busy signal can be specified as the default call treatment for calls received from blacklisted callers, and a personal message can be recorded and specified for use with respect to calls received from one or more identified blacklisted callers (e.g., a customer can record a message to be played in response to calls from an ex-boyfriend, such as "I never want to speak with you again, please stop calling"). Optionally, the customer can specify that a blacklist is to be temporary in nature, with a specified operational time period (e.g., with a specified start and end date).

Similarly, text or multimedia messages to the subscriber from a blacklisted sender (e.g., spam, such as SMS or MMS spam) can be responded to with standard reply rejection messages or messages customized, specified (e.g., written or drawn by), or selected from a menu of messages or message components (e.g., text and multimedia) by the subscriber. For example, a categorized, hierarchical menu of text and/or images (e.g., pictures, icons, songs, tunes, etc.) can be provided, organized according to the following example categories, although fewer, additional, or different categories can be provided:

Business oriented;
To a spammer;
To an ex-girlfriend;
To an ex-boyfriend;
To a family member;
Temporary blacklist notification;
Humorous;
Annoying.

By way of illustration, if the customer wants a humorous notification to be provided in response to a visual message from a blacklisted entity, the customer may select the "Humorous" menu item, and a further menu of text and images is presented from which the customer can select humorous text and/or a humorous image. The customer's selection is stored in an account record associated with the customer, and a notification message based on the selections will be transmitted to the appropriate blacklisted entities in response to a message from those entities.

Providing users with an easy to use interface for blocking inbound calls and messages reduces the number of unwanted calls and messages received by the user. This reduction in transactions can reduce a subscriber's phone bill, network utilization (e.g., of a wireless or wired network), and improve their overall communications experience, increasing the attractiveness and value to the subscriber of the service provider's telecommunications service offering.

For example, in the SMS/MMS notification case (or other visual notification), a service provider or customer can configure a voice mail service or other service that receives calls intended for a customer, to send SMS/MMS notifications to the customer's mobile phone in the event of a call. Optionally, a reply (e.g., without any text or with certain specified text) is treated by the system as an indication that the caller should be placed on a "blacklist" The reply may be provided using the same messaging service-type as used to transmit the message (e.g., if the notification was sent via an SMS message, the reply is also provided via an SMS message), or via a different messaging service-type. Optionally, the service provider and/or the customer may specify certain text that needs to be entered in the subject and/or message body such as BLOCK or BLK, or other content to indicate that the caller should be placed on a blacklist Optionally, the customer and/or service provider can specify that no text or other content is to be provided in the subject and/or message body to indicate that the call should be placed on a blacklist.

Once placed on the blacklist, subsequent calls from the caller (e.g., from an originating phone address provided via the associated call signaling that is associated with the caller as specified in the customer's contact database or other data store) to the subscriber are rejected using one or more of the techniques as described herein (e.g., using a busy tone, a default system voice announcement message, a message recorded by the customer, or otherwise).

Optionally, in addition to, or instead of the blocking command techniques described above, the service provider or other entity can configure a telecommunications device or client application input control or key (e.g., a wireless handset soft key in the menu options presented to the user when reviewing or deleting a message) that gives the subscriber the option to "blacklist" future calls from the caller by activating the input control or by providing the appropriate input. By way of further example, optionally the user can provide a blacklist command by pressing one or more specified telephone keypad keys (which may generate DTMF tones that can be received and interpreted by the call processing system as a blocking command).

Figure 2:
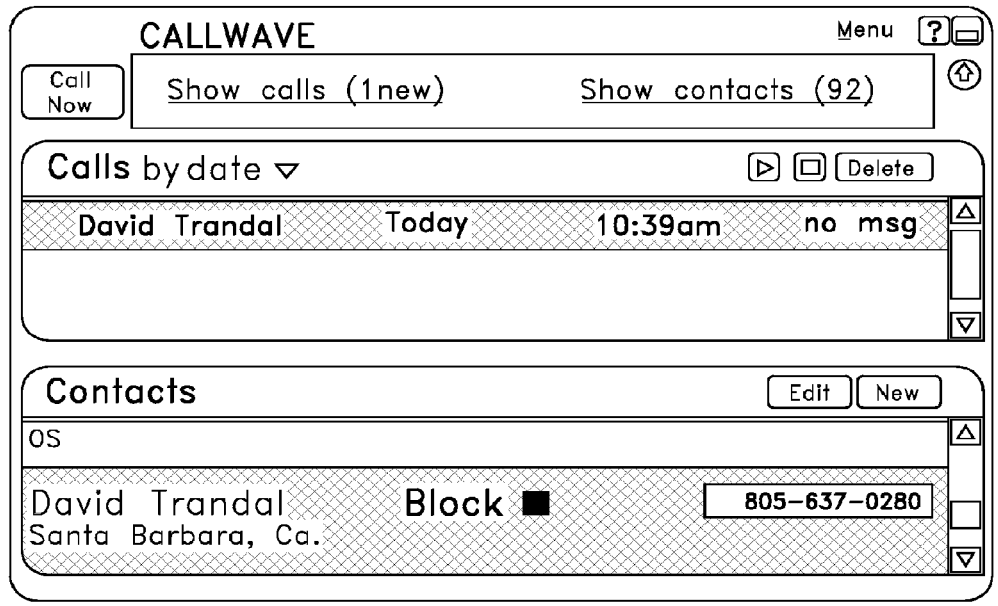
FIG. 2 illustrates a first example telecommunications client call log and user contact interface with a call blocking option within a contact display.

Certain example user interfaces, systems, and processes will now be discussed with reference to the illustrative figures. Referring to FIG. 2, when using a contact list (e.g., an electronic address book/database) to provide a blocking instruction, a subscriber can designate that a contact be added to the blacklist by selecting a "block" check box in the corresponding contact, or via other appropriate user interface. Optionally, the subscriber can remove the contact from a blacklist by reselecting (e.g., "unchecking") the associated check box. Other user interfaces can be used as well (e.g., a hyper link, a drop down menu, a voice command, etc.). In this example, in addition to the contact record, the user interface displays a call log listing call(s), the call date, the call time, and an indication as to whether or not a caller left a recorded voice message or a fax. If a voice message or fax was received, a link is provided which when activated causes the message to be played or the fax to be displayed. In addition, a summary listing the number of new calls and the number of contact records are presented. A "call now" control is provided which, when activated, cause a call to be placed to the selected contact.

Figure 3:
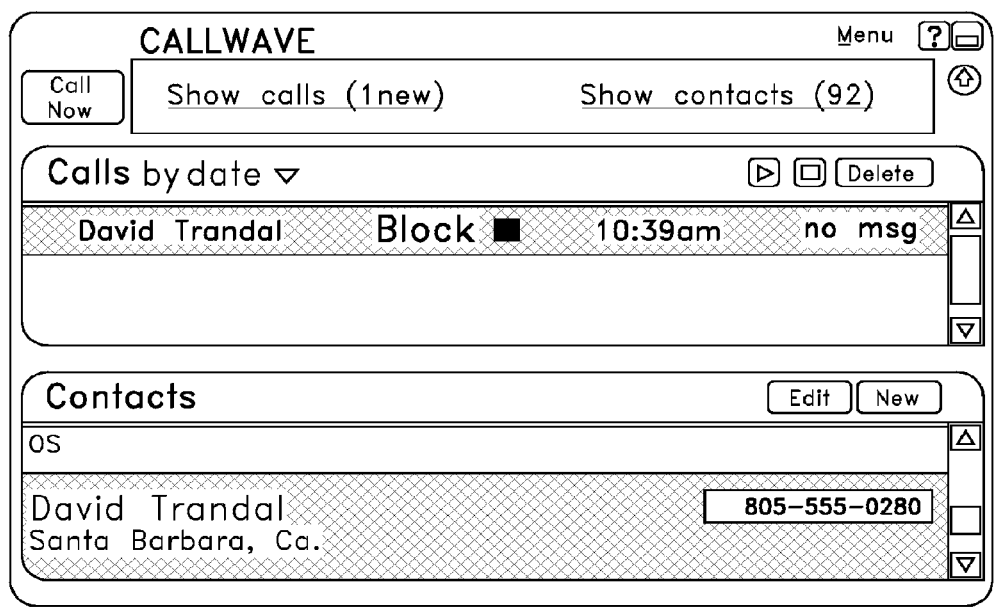
FIG. 3 illustrates a second example telecommunications client call log and user contact interface with a call blocking option within a call list.
Figure 8:
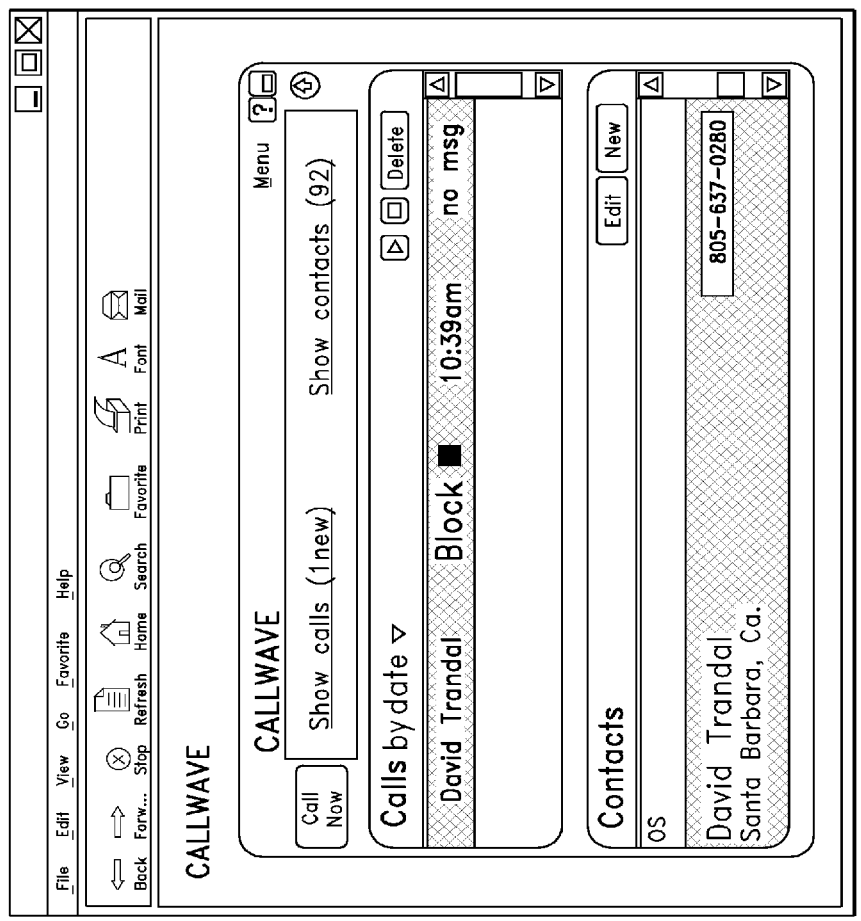
FIG. 8 illustrates a third example web browser client call log and user contact interface with a call blocking option in a call list.

Referring now to FIG. 3, an example user interface (e.g., presented via a client application) displays a contract record, a call log, and a summary as to the number of new calls received and the number of contact records, as similarly discussed above with respect to FIG. 2. In this example, the call log is used to provide a blacklisting designation. When a call log is used to designate a call/caller as a blacklisted contract, a subscriber can designate that a contact be added to the blacklist by selecting a "block" check box next to a call log entry, by way of example. Still other user interfaces can be used as well. FIG. 8 illustrates a user interface similar to that illustrated in FIG. 3, presented via a web page using a browser.

Optionally, calls from blocked callers are displayed in a caller's call list although the caller call is not connected to the subscriber. This enables the subscriber to see how effective the blocking service is performing. In addition, a field next to the blocked call (e.g., a check box) can be used to "unblock" or remove the caller from the subscriber's blacklist Optionally the subscriber can configure their account to display blocked calls or not to display blocked calls.

Optionally, a subscriber can review and/or specify (e.g., using interfaces described above, via an account set-up/members zone Web page, via a Web site of a corresponding service provider, and/or via a telecommunications client, wherein the specification is stored in computer readable memory such as a database or file system) which callers and/or contacts have been placed on the blacklist. Further, this blacklist interface can be used to add new callers or remove callers from the current call blocking list. For example, a subscriber can create or access, edit, and save a blacklist record.

Figure 4:
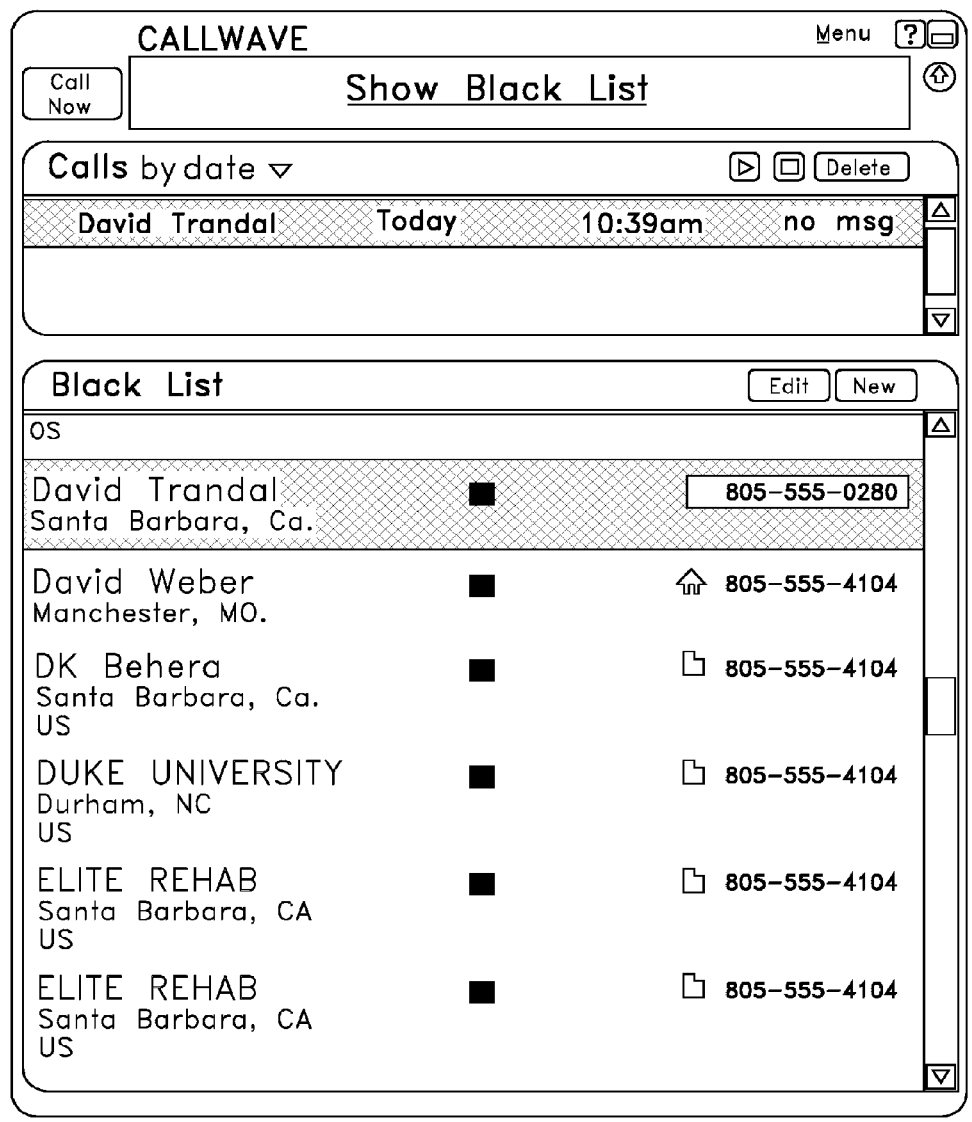
FIG. 4 illustrates a first example telecommunications client showing a blacklist of contacts/callers.

FIG. 4 illustrates an example blacklist user interface presented via a client application. By way of example, a blacklist record can include some or all of the following fields: name, first phone address, second phone address, third phone address, email address, and corresponding data population those fields. Optionally, a blacklist record may have one or more fields automatically prepopulated (e.g., the name field and/or a phone address field) with information received via call signaling information associated with a call from a caller. The subscriber can enter multiple known phone addresses associated with the caller (which can be a past or potential future caller) so that call received from those phone addresses will be blocked. For example, the phone addresses may include the caller's work, home, mobile, and/or Internet protocol phone addresses. In addition, a "blocked caller" indicator is provided for a blacklist entry.

Figure 5:
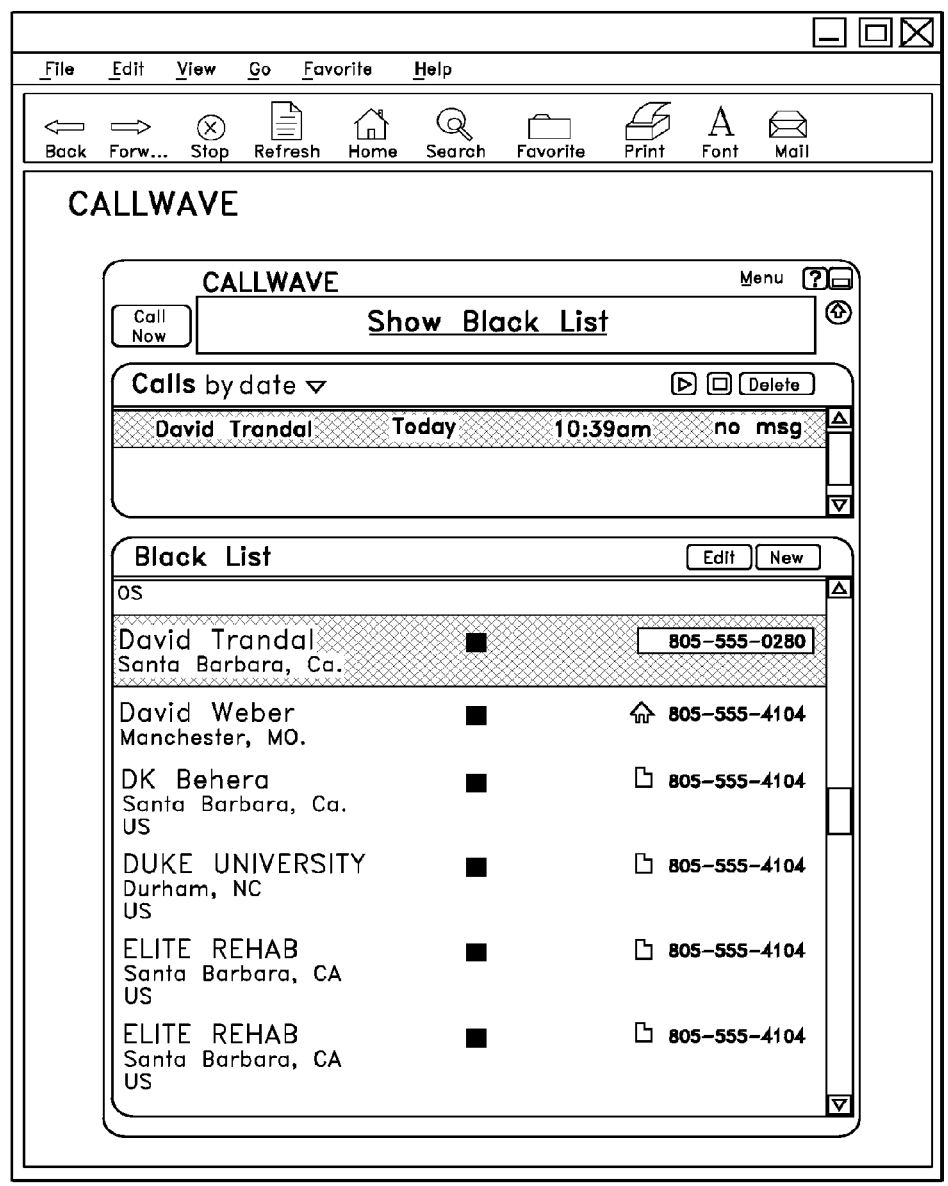
FIG. 5 illustrates a second example web browser client showing a blacklist of contacts/callers.

Referring to FIG. 4, in this example, an "edit" control is provided, which when activated, enables the user to edit a blacklist record (e.g., the name, location, phone number or other fields), and unblock/unblacklist a contact. A "new" control is provided, which when activated, present a blank blacklist record which the user can populate. FIG. 5 illustrates a blacklist interface similar to that shown in FIG. 4, except the interface is presented via a web page using a browser.

Certain example embodiments described herein provide methods and systems for presenting an archive or history of calls and messages. For example, a subscriber can use software, such as a widget, a gadget, a plugin, or an extension to send messages.

By way of example, a widget can be an interface element that a user interacts with. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

By way of further example and not limitation, a text widget, text gadget, web page, or cell phone can be used to send and receive a text or multi-media message. Similarly, a subscriber can receive a reply via a user interface (e.g., implemented via a widget, a gadget, a plugin, or extension), such as that provided by a text widget, text gadget, web page, or cell phone. Messages can be sent from and received by the subscriber in a conversational or chat manner (e.g., where participants optionally communicate in real time, such as by using instant messaging, where the communications include text).

Sent and received messages are optionally stored in local and/or remote computer accessible memory in an archive (e.g., in a database) for later review. This message archival can be optionally offered by a service provider as an enhanced or premium service (e.g., for an additional fee or as part of an enhanced service offering).

Example processes and systems described herein can optionally be used in conjunction with processes and systems described in U.S. patent application Ser. No. 11/526,200, filed Sep. 22, 2006, incorporated herein by reference.

Certain embodiments of the call processing system providing these types of call blocking services use triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a softswitch (e.g., acting as a Service Control Point (SCP) in the SS7 network, and connecting calls from one phone line to another, using, for example, software running on a computer system), receives a query that enables the softswitch to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the description herein, the term "Web site" or "Web" is used to refer to a user-accessible network site that implements the basic World Wide Web standards and/or conventions for the coding and transmission of hypertextual documents. These standards currently include HTML (the Hypertext Markup Language) and HTTP (the Hypertext Transfer Protocol). It should be understood that the term "site" is not intended to imply a single geographic location, as a Website or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the description herein refers to example network and telephony standards and protocols, other standards and protocols can be used as well. In addition, while references may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

While some examples refer to certain example messaging protocols (e.g., SMS or MMS) for illustrative purposes, other messaging protocols can be used as well (e.g., instant messaging, email, etc.).

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls. An example of a user interface provided by such as a client is illustrated in FIG. 2. Optionally, a customer can have multiple clients hosted on multiple computers or other hosts.

In an example embodiment, the telecommunications client application connects to and communicates with a softswitch via the Internet, an intranet, or other network. The client application, executing on a subscriber's computer terminal or other host, can make the subscriber's online presence known to the softswitch (e.g., by transmitting a message over the Internet to the softswitch). Optionally, the client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone. The client application can display a log of recorded messages from callers, and optionally can provide playback controls (e.g., play, fast forward, rewind) for playing back or displaying the recorded message (e.g., a voice message, a video message, a fax message, etc.) via the client computer terminal.

The client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions. Options are also provided in the client to respond to calls using a text reply option and/or multimedia reply option. In addition, options are provided whereby a user can search their contact database and/or the web.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

A telecommunications client is just an example user interface. FIG. 8 illustrates another example call log user interface presented via a browser to a customer. The browser can be executing on a computer terminal, such as a personal computer, a Wireless Application Protocol (WAP)-enabled phone, a PDA or the like. The call log can be accessed by supplying the appropriate URL to the browser and optionally providing log-on information, such as a user name and a password.

The functionality, operation, and implementation for an example service utilizing blocked calls and a blacklist will now be described in further detail.

GLOSSARY

AIN—Advanced Intelligent Network
CP—Carrier Partner
IP—Intelligent Peripheral
MMS—Multimedia message service
MSC—Mobile Switching Center
SCP—Service Control Point
SMS—Short Message Service
SSP—Service Switching Point
SS7—Signaling System 7
TCAP—Transaction Capabilities Application Part FIG. 1 illustrates an example advanced telecommunications network environment. A service provider or carrier (e.g., a Carrier Partner) customer may have one or more landline phones 132 that connect to a local exchange switch or an SSP 104 in the carrier's network 106. The customer may also have one or more mobile phones 134 and one or more hosts (e.g., personal computers, networked televisions, personal digital assistants, smart phone, etc.) running a telecommunications client 136. In addition, a customer may have one or more phones connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP or other protocol) to a call routing service provider or other destination.

The telecommunications client 136 has one or more user interfaces that display some or all of the following: a call log, text messages, a contact record/list, an optional automated character, and active, in-progress calls. The customer can elect to screen or take an active call or respond to a caller with a text message. Optionally, calls can also be made (originated) via the telecommunications client 136 (e.g., where the host is equipped with a speaker and microphone). Optionally, information about a caller can be retrieved through a search function.

In this example, the softswitch 114 has a number of components, some of which are optionally centralized at a given location, others of which may be co-located in the carrier's network 106 (e.g., to reduce network transport costs). A SCP 116 (Service Control Point) is an optional AIN component that interacts with the SSPs 104 (e.g., using the TCAP protocol). AIN triggers are armed for the customer's landline phone number/address/account so that when calls are made to or from that phone, a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle).

In a non-AIN deployment, the softswitch 114 optionally interconnects with the PSTN 108 using, by way of example, SS7. In this case, in an example embodiment, the SS7 signaling information associated with a call terminates on a call controller subsystem or the like, and the trunks (or bearer channels) terminate on one or more call managers 126 (described further below). Optionally instead, the call controller subsystem and/or associated functions thereof, are included in the call manager 126 subsystem.) !!

In a VoIP deployment scenario, the softswitch 114 interconnects with the PSTN 108 through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet 129.

In an example embodiment, SS7 Wireless Intelligent Network (WIN) triggers are set in the mobile switches of Wireless Carrier Partners to provide similar calling services as described herein with respect to a landline phone for a customer's mobile phone number/address/account.

In an example embodiment, the softswitch 114 also contains one or more systems referred to as call managers 126. The call managers 126 are connected to the PSTN 108 (e.g., via ISDN using the ISUP (ISDN User Part) protocol, by way of example, although other protocols can be used). The call managers 126 provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN 108) and SIP-based networks (VoIP). Thus, the call manager can provide interactive voice response functionality which can detect voice and/or touch tones during a call and can respond with pre-recorded and/or dynamically generated audio prompts to direct callers how to proceed or to request caller instructions.

The example call manager 126 optionally can also act as an IP (Intelligent Peripheral), another AIN component that the SCP 116 can instruct the SSP 104 to connect into the call for interaction with the called and calling party. The IP/call managers 126 and SCPs 116 in the softswitch 114 optionally share a call registry 117 that stores information about active calls.

The session managers 124 in the softswitch 114 optionally track telecommunication client presence and interact with a given telecommunications client 136 (e.g., a client application hosted on a personal computer, PDA, smart phone, or a networked television) as call log, contact, and/or customer data needs to be synchronized with the centralized databases to provide the customer, via the client, with updated log, contact, and/or customer data. The session managers 124 also optionally provide the SCP 116 in an AIN environment and call manager 126 in a non-AIN environment with service configuration information for the customer involved in a call. During an active call, the SCP 116 and/or IP/call manager 126 optionally directly or indirectly interact with the telecommunications client 136 to provide call progress information, and to stream audio and/or visual content.

A customer account can be enabled or disabled for the call blacklisting service in the softswitch 114 (e.g., wherein certain service packages and/or service prices do not include the call blacklisting service, and certain service packages and/or service prices include the call blacklisting service). As described below, an account optionally has an associated contact list (e.g., electronic address book/database) that the customer uses to designate whether to block calls from this phone number or address.

The softswitch 114 in this example contains centralized databases and/or a general-purpose storage area, optionally including, but not limited to, some or all of the following: a call log database 118, a contacts database 120, and a customer database 122. Optionally, the databases are not centralized and may be distributed geographically and/or over different systems. The call log database 118 stores call events and related data for incoming and/or outgoing calls and text and/or multimedia messages. The contacts database 120 stores information and parameters (e.g., names, identifiers, and/or phone numbers/addresses, birthdays, notes, automated characters, etc.) associated with a sender, called, or calling party. The customer database 122 stores information and parameters (e.g., account data and configuration information) associated with subscribers/customers/users.

The softswitch 114 call processing system optionally includes other subsystems, such as some or all of the following: a router subsystem, which serves as an interface to the Internet 129 to manage communications between online IP client devices (telecommunications client 136, browsers, widgets, etc.) and call processing servers, a web server subsystem to manage a "web site" associated with the softswitch 114 (e.g., via which a user can access an account set-up/configuration user interface, a call log, a contacts database 120, etc., using a browser or other network user interface), etc. These subsystems are optionally interconnected via a Local Area Network (LAN), a Wide Area Private Network (WAN), and/or a Wide Area Public Network (e.g., Internet 129). The call manager 126 can communicate with the mobile phones 134 across the PSTN 108 over a wireless network 112 via the corresponding MSC 110.

Figure 6:
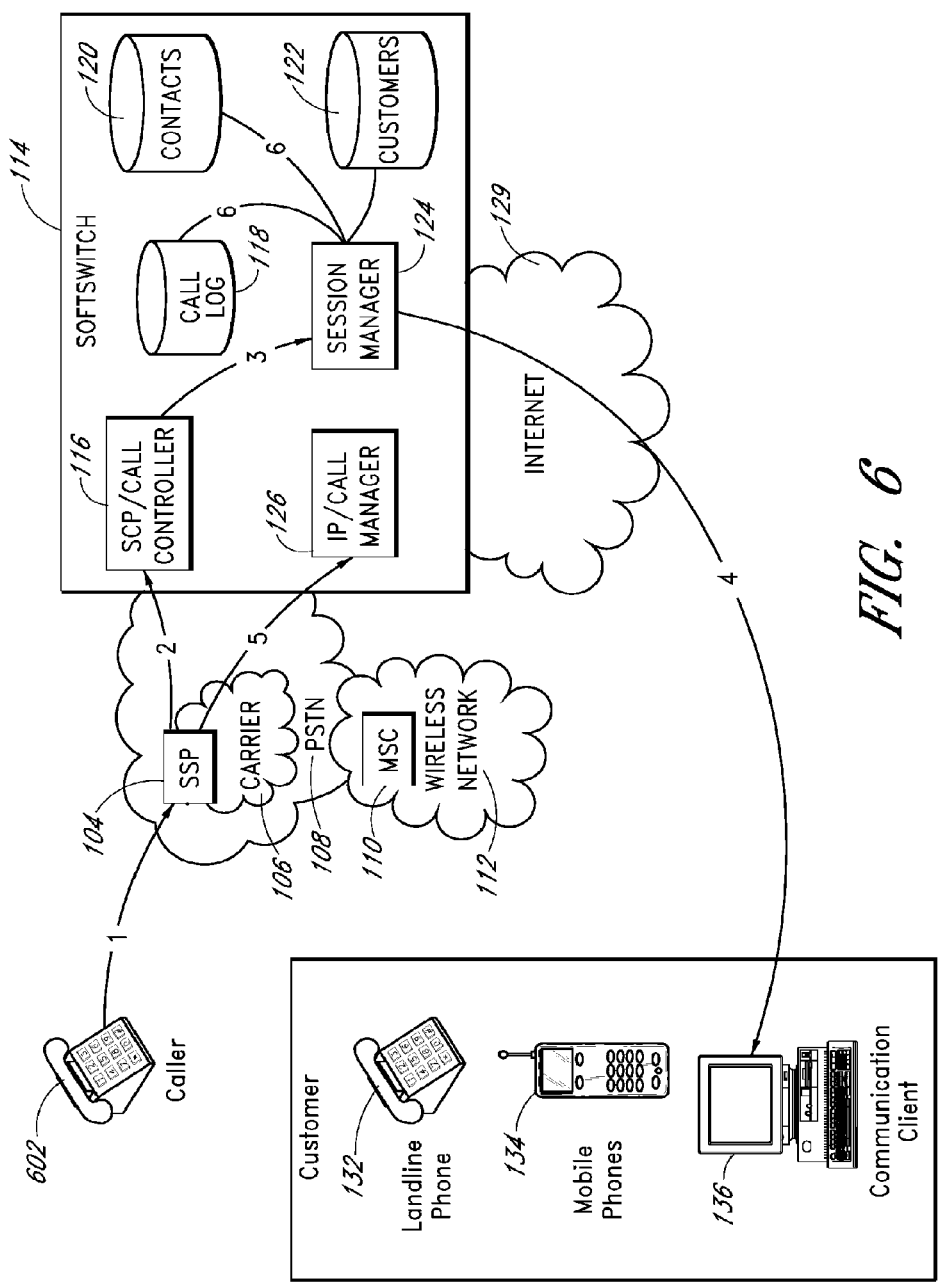
FIG. 6 illustrates an example operating environment/process where a call is blocked.

FIG. 6 depicts an example inbound call scenario in which a caller dials a customer's phone, referred to as the called party, a subscriber to a telecommunications service offering call blacklisting, has included the calling party on his/her list.

State 1. A caller 602 dials the customer's landline phone number/address (or other phone-type address). The call is routed through the PSTN 108 to a carrier (e.g., a CP). In the example, the call is routed to a carrier's SSP 104 serving the customer's landline phone 132.

State 2. Because the called party is unavailable in this example, the call is not answered by the called party. After a specified number of rings (e.g., a Ring-No-Answer Condition) and/or after a specified amount of time (or in the event of a busy condition), the SSP 104 forwards the call to a softswitch 114 (e.g., an Enhanced Service Provider softswitch 114 and/or call processing system). In the forwarded call, the SSP 104 includes some or all of the call signaling information associated with the call, including, for example, the caller phone number/address, a privacy indicator (indicating, for example, whether the caller phone address is to be revealed to the called party via a caller ID display), a designation of whether the call was a forwarded call, and/or the called party identifier (e.g., phone number/address or account number).

State 3. The receiving softswitch 114 verifies the called phone number is that of a customer (e.g., a subscriber of a service offered by the operator of the softswitch 114 and/or other entity having an account associated with the softswitch 114), optionally by determining if the called phone number or other identifier associated with the called party matches a customer number in the customer database 122 (which stores customer account records). The softswitch SCP 116/call controller queries the softswitch session manager 124 to obtain some or all of the following: service configuration for the customer being called, the customer's call location, the customer's online status (e.g., online or offline), and contact information for the caller 602 (including whether calls from this caller should be blocked). In this example, the contact information indicates the call is to be blocked.

State 4. Optionally, the session manager 124 notifies the customer's telecommunications client 136 on the SCP 116/Call Controller's behalf that there is an incoming call. The client displays the call in its active call window (e.g., a call alert user interface) with the status set to "blocked".

State 5. The call manager 126 begins playing a greeting (e.g., a canned greeting or a greeting prerecorded by the customer, such as one that states the customer's is no longer accepting calls from the calling party, wherein optionally the name and/or phone address of the calling party is recited in the greeting).

State 6. The caller 602 hangs up without being provided the opportunity to leave a message (although optionally instead, if so specified by the customer, the caller 602 is asked to and is able to record a message for later retrieval by the customer, but the caller's call is blocked/not connected to the customer). The call manager 126 logs the call and optionally updates the call frequency information for the contact (e.g., the call manager 126 tracks the total number of calls received from a given phone number and/or caller 602, wherein the "total number of calls" can be the total number of calls received from a specific date, calls received since call blocking was established, within a specified time period, or otherwise). The telecommunications client 136 or call log web page clears the active call display and optionally adds the call to the top of the call log with designation blocked.

Optionally, at state 1, the SSP service provider uses one or more AIN triggers in the call flow. For example, a trigger, (e.g., a Termination Attempt Trigger) is set on the subscriber's line in response to the call. The trigger fires causing a TCAP query to the configured Service Control Point (SCP 116)/Call Controller point code. The TCAP query includes the called party and/or calling party phone number/address, or optionally instead or in addition to the called party phone number/address, another called party identifier, such as an account number or a UserID, can be included in the TCAP query. The TCAP protocol provides for communication between applications in different signaling points in an SS7 network and enables the deployment of advanced intelligent network (AIN) services by supporting non-circuit related information exchange between signaling points using the SCCP connectionless service, although other data communications protocols could be used as well.

The SCP 116 queries the call processing database or session manager 124 and verifies the called phone number is that of a customer (e.g., a subscriber of a service offered by the operator of the call processing system and/or other entity having an account with the call processing system), optionally by determining if the called phone number matches a customer number in the customer database 122 (or if another called party identifier is used, then a determination of that identifier matches a corresponding identifier in the customer database 122). If the called party is a customer, optionally the call processing system determines if the customer has designated whether calls from this caller should be blocked. If so, the SCP 116/Call Controller sends a message to the SSP 104 requesting the call be rejected (e.g., with busy signal). Optionally, the SCP 116/Call Controller sends a message to the SSP 104 requesting the call be directed to an Intelligent Peripheral or other Interactive Voice Response system to play a call rejection prompt or rejection greeting recorded by the customer.

Optionally, a customer can specify (e.g., via the telecommunications client 136 and/or via a user interface provided via a Web page hosted by a Website, wherein the customer specification is stored in computer readable memory in a customer account record) whether a call rejection message is to be played to the blacklisted caller (e.g., as performed in state 5 of the example above), or whether calls from blacklisted callers should not be answered at all. If the customer specified calls from blacklisted callers should not be answered at all, optionally, ringing or a busy signal will be played to the caller until the caller or the network disconnects the call (e.g., hangs-up).

Call blacklisting can optionally be applied to private numbers (e.g., wherein the call signaling information indicates that caller ID is blocked and that the caller phone number is not to be disclosed to the called party). In a call processing system as described above, private numbers are not displayed to the called party unless the calling party has released the phone number. patent application Ser. No. 11/039,374 filed Jan. 19, 2005, and incorporated herein by reference, describes systems and methods for providing, among other things, the ability for a subscriber to cause a caller to release their private number on an individual call basis. U.S. Pat. No. 6,738,461 further describes returning calls to private phone numbers, and is incorporated herein by reference.

Even if a calling party has not released their phone number, the system described above can offer the user/subscriber the option to block future calls from this caller by designating call blocking from a call log or contact entry (e.g., using example user interfaces as shown in FIGS. 2 and 3). A user gesture/input provided via a telecommunications client 136 and/or web page to block calls will cause the number, known by the call processing system (e.g., Call Manager) from the call signaling information, to be added to the blacklist Subsequent calls to the subscriber from the blacklisted calling party phone address, even if designated "private", will be blocked by the call manager.

Figure 7:
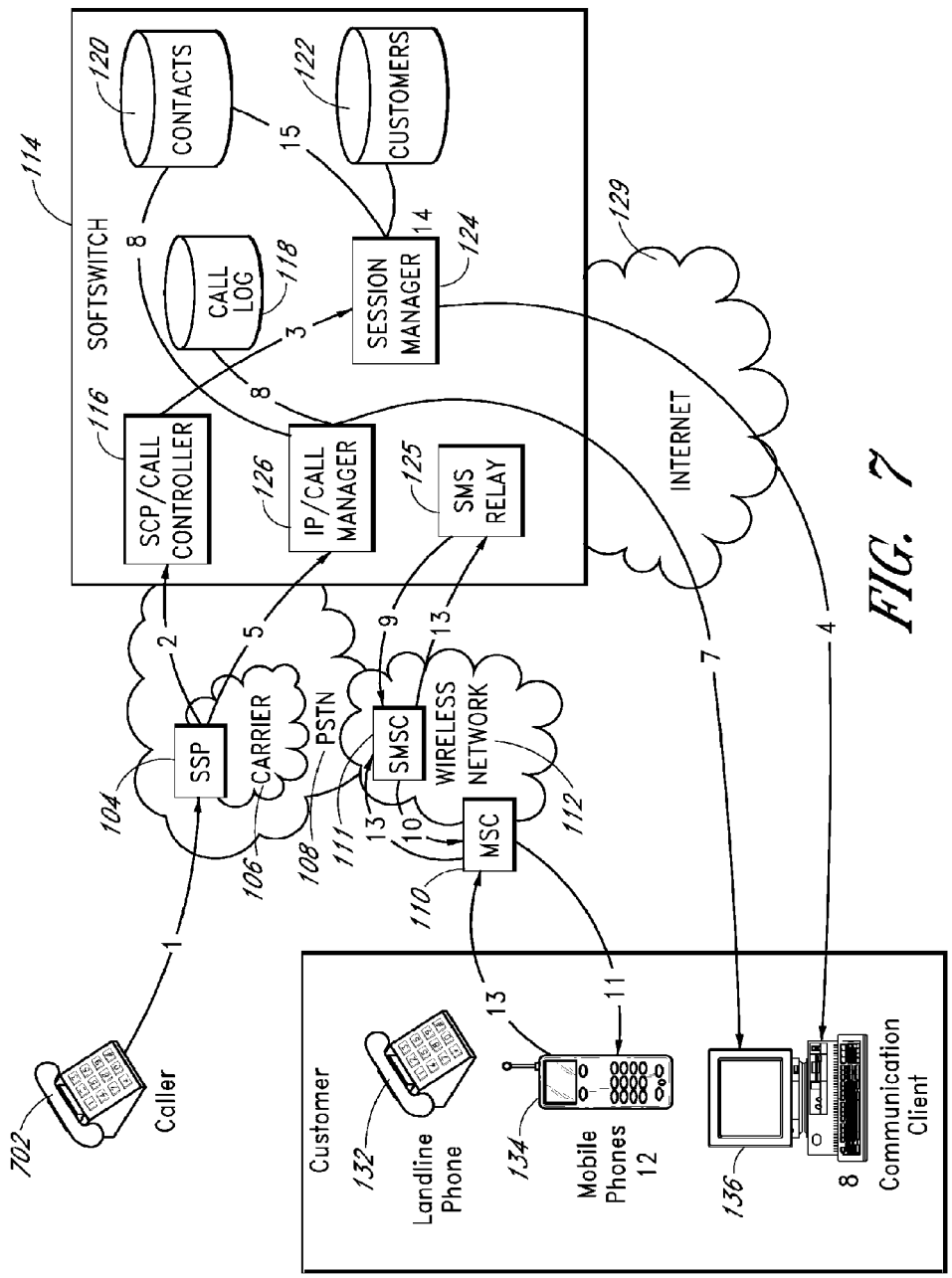
FIG. 7 illustrates an example operating environment/process where a caller is added to a called party's blacklist using a Short Message Service.

FIG. 7 depicts another example call scenario in which a caller dials a customer's phone, the called party is unavailable, a message is left by the caller, the called party is notified of the message (e.g., via SMS), the called party replies to the call notification, and the call processing system by default adds the calling party to the called party's phone blacklist.

State 1. A caller 702 dials the customer's landline phone number/address. The call is routed through the PSTN 108 to a carrier's (e.g., a CP's) SSP serving the customer's landline phone 132.

State 2. Because the called party is unavailable in this example, the call is not answered by the called party. After a specified number of rings (e.g., a Ring-No-Answer Condition) and/or amount of time, the SSP 104 forwards the call to a softswitch 114 (e.g., an Enhanced Service Provider softswitch 114 and/or call processing system). In the forwarded call, the SSP 104 includes some or all of the call signaling information associated with the call, including, for example, the caller phone number/address, a privacy indicator, a designation of whether the call was a forwarded call, and/or the called party identifier (e.g., phone number/address or account number).

State 3. The receiving softswitch 114 verifies the called phone number is that of a customer (e.g., a subscriber of a service offered by the operator of the softswitch 114 and/or other entity having an account associated with the softswitch 114), optionally by determining if the called phone number or other identifier associated with the called party matches a customer number in the customer database 122 (which stores customer account records). The softswitch 114 SCP 116/Call Controller queries the softswitch 114 session manager 124 to obtain some or all of the following information: service configuration for the customer being called, the customer's call location, the customer's online status (e.g., online or offline), and contact information for the caller 702. In this example, the customer's account has call screening enabled and the customer has at least an instance of a telecommunications client 136 online.

State 4. The session manager 124 notifies the telecommunications client 136 on the SCP 116/Call Controller's behalf that there is an incoming call. The client displays the call in its active call window (e.g., a call alert user interface) with the status set to "ringing". A control (e.g., a Take Call button) on the telecommunications client 136 is available to the customer to take action on the call (e.g., establish duplex communications with the caller 702, transfer the call, etc.).

State 5. The call manager 126 begins playing a greeting (e.g., a canned greeting or a greeting prerecorded by the customer, such as one that states the customer's name and/or asks the caller 702 to leave a message) to the caller 702 and the softswitch 114 notifies the telecommunications client 136 to cause the active call display to show "greeting caller".

State 6. The call manager 126 plays a record tone and begins recording a message from the caller 702.

State 7. The call manager 126 notifies the telecommunications client 136 to change the active call display to "recording". The call manager 126 then begins streaming the audio over the Internet 129 to be played by the telecommunications client 136 in substantially real-time (e.g., so that the called party, if present, can listen to the message as it is being recorded).

State 8. The caller 702 hangs up after leaving a message, causing the call manager 126 to log the call and update the call frequency information for the contact (e.g., the call manager 126 tracks the total number of calls received from a given phone number and/or caller, wherein the "total number of calls" can be the total number of calls received from a specific date, within a specific time period, or otherwise). The telecommunications client 136 clears the active call display and optionally adds the call to the top of the call log.

State 9. A Short Message Service relay 125 within the call processing system composes a call notification Short Message (SM), addresses it to the customer's mobile phone (or other device capable of receiving Short Messages designated by the subscriber via the telecommunications client 136 or via the account management Web page) and sends the message to a Short Message Switching Center (SMSC) 111.

State 10. The SMSC 111 transmits the received message to the MSC 110.

State 11. The MSC 110 transmits a notification to the mobile phone informing the mobile phone (or other designated communications device) there is a message waiting. In response, the mobile phone displays via a phone display an icon and/or text indicating that there is an SM waiting, and/or audibly provides an alert.

State 12. The customer in this example notices the message waiting icon, text, and/or audible alert and requests to view the SM (e.g., via a menu selection, by clicking on an entry corresponding to the SM, or otherwise). The customer reviews the message and decides to block future calls from the caller 702. The customer replies to the message so as to indicate that future calls from the caller 702 are to be blocked. For example the customer optionally replies with a specified call blocking message in the message subject field (e.g., BLOCK, BLK or other specified term, such as a term specified by the call processing operator) optionally entered by the customer using a phone keypad/keyboard, with no subject or message, or by selecting a Block menu option on the customer's cell phone (which can be, by way of an example, a soft key).

State 13. The message transits back through the MSC 110, the SMSC 111, and is received by the Short Message relay 125 within the call processing system.

State 14. The session manager 124 verifies the address or other identifier is that of a customer, parses the message, determines this is a reply from a customer in response to a specific call notification, and determines that the message is a call blocking instruction associated with a call or caller 702 corresponding to the specific call notification.

State 15. The session manager 124 adds the calling party to the customer's blacklist and optionally updates the subscriber's contact records to indicate that the caller 702 is blacklisted.

While the above examples refer to calls forwarded to the softswitch 114 (e.g., on a ring-no-answer condition), the calls optionally could have been placed to a virtual phone number associated with the customer and "owned" by the softswitch 114, so that calls to the virtual phone number are received at the softswitch 114 without needing to be forwarded (e.g., which terminates directly on the softswitch 114). Further, while the above example refers to transmission of an SMS message over a mobile network to a customer mobile phone, other message types (e.g., email or instant messages) can be transmitted over other types of networks (e.g., an Internet protocol network) or other device types (e.g., an Internet protocol phone). Similarly, call blocking instructions can be provided via other types of networks via other device types.

Figure 11:
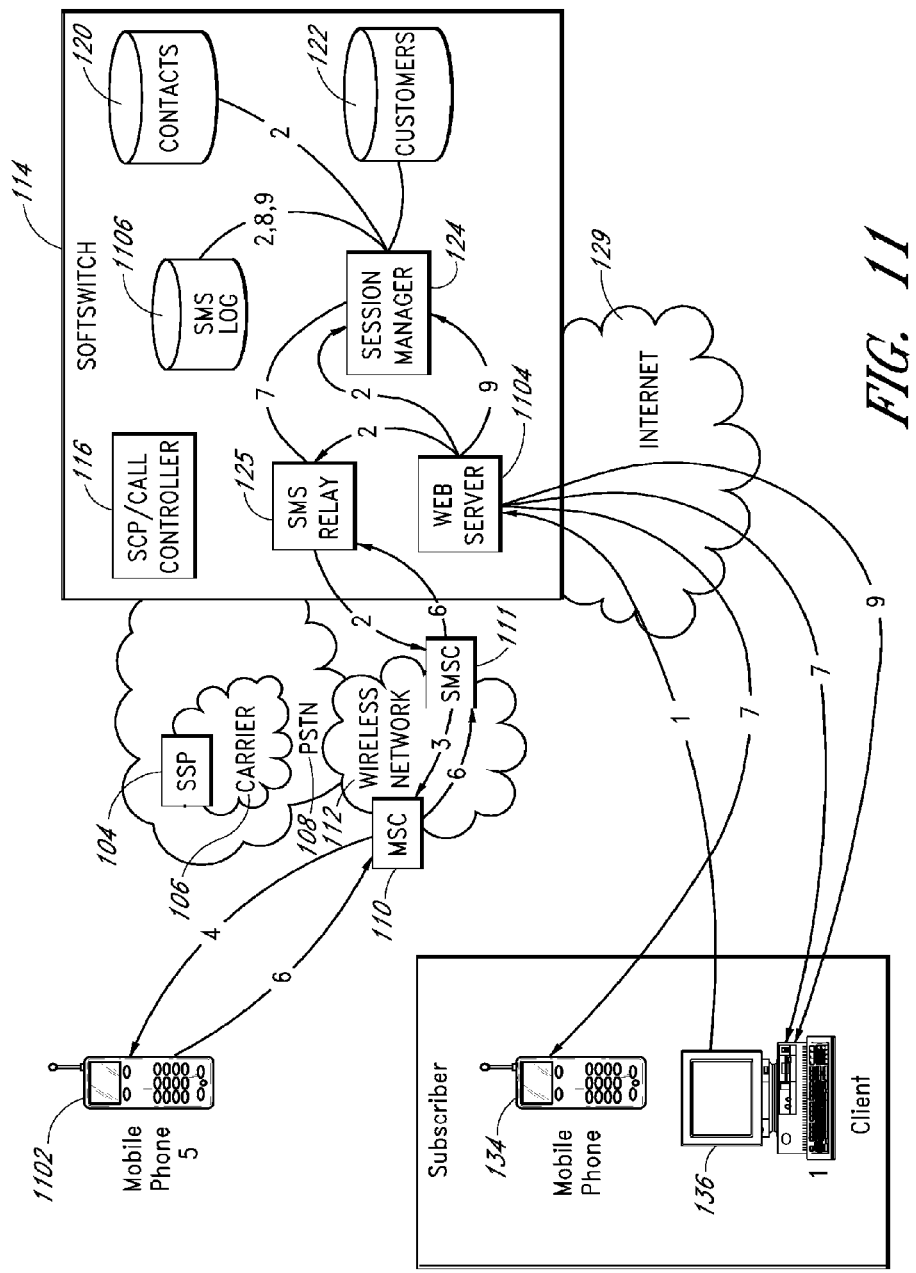
FIG. 11 illustrates an example messaging scenario.

FIG. 11 depicts another example messaging scenario in which an archive of messages (e.g., text messages) is optionally stored/displayed on a web page for review by the subscriber. The following example refers to text messages and SMS, however multimedia messages and MMS can be used instead or in addition. Similarly, while the following example refers to widgets other types of applications/code can be used as well.

State 1. A subscriber enters a phone address (or selects a contact from an address book) into a text widget, optionally selects the carrier associated with the phone number, and types a message (e.g., a text message), then activates a "send" control (e.g., using the interface illustrated in FIG. 9).

State 2. A web server 1104 stores information related to the message and then transmits the message to a relay 125 (e.g., a Short Message Service relay) within a call processing system. The relay 125 then transmits the message to a message switching center 111 (e.g., an SMSC). Information stored by the call processing system optionally includes some or all of the following data: time and date message was sent, receiving party identifier (e.g., receiving party phone address and/or name), carrier selected by the user or by the call processing system, message (e.g., message text), etc. In addition, a contact record (e.g., an SMS contact record) is optionally created if one does not already exist.

State 3. The SMSC 111 transmits the received message to the MSC.

State 4. The MSC 110 transmits a notification to a mobile phone 1102 informing the mobile phone 1102 (or other designated communications device) there is a message waiting. In response, the mobile phone 1102 displays via a phone display an icon and/or text indicating that there is an SM waiting.

State 5. The receiver notices the message waiting icon and/or text and requests to view the SM (e.g., via a menu selection, by clicking on an entry corresponding to the SM, or otherwise). The receiver reviews the message via the mobile phone 1102 and decides to reply. The receiver composes a reply and selects an option to send the message.

State 6. The message transits back through the MSC 110, the SMSC 111, and is received by the Short Message relay 125 with the call processing system.

State 7. The SMS relay 125 verifies with the session manager 124 the address or other identifier (e.g., a short code associated with the receiver and sender) is that of a customer by accessing a corresponding database and comparing the address or other identifier with that stored in the database. Depending upon a configuration setting, optionally set by the subscriber or service provider, the message is optionally forwarded to a customer's application (e.g., a telecommunications client 136, a text widget, a text gadget, etc.), an email address, and/or a mobile phone (e.g., a cell phone). In this example, the customer chose to have replies sent directly to the customer's mobile phone 134 and a client application 136 hosted on the customer's computer.

State 8. The session manager 124 optionally stores a copy of the message in a data base (e.g., an SMS log data store 1106) or file system associated with the customer's account.

State 9. The customer later decides to review the text conversation on the customer's text archive web page. The customer selects the archive button on a text widget (e.g., using the interface illustrated in FIG. 9) and a web page optionally displays the customer's most recent or all of the customer's SM transactions (e.g., via the user interface illustrated FIG. 10). Optionally, the customer can specify how many and/or the time frame of the displayed transactions.

Figure 9:
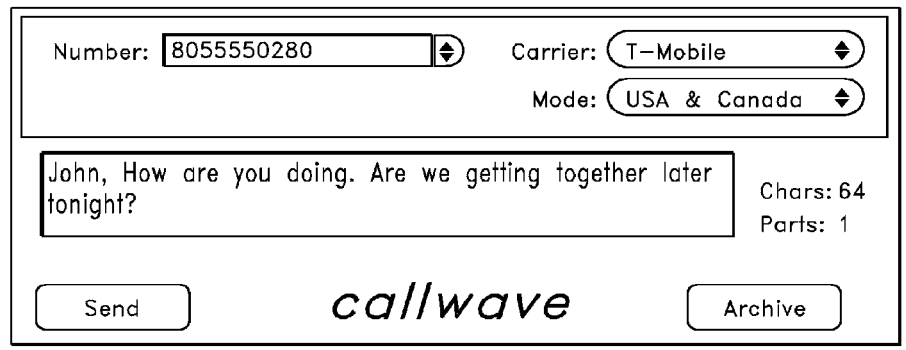
FIG. 9 illustrates an example user interface used to send text messages.

FIG. 9 illustrates an example user interface used to send a message to a communication device, such as a mobile phone. A "number" field is provided via which a user can enter the message destination address (e.g., a cell phone number). Optionally, a contacts link can be provided which enables the user to select a contact from a contact database. An optional carrier field is provided via which the user can select the carrier associated with the destination device. In this example, the user can select a carrier from a list of carriers. An optional mode field is provided via which the user can specify or select a geographic/national area (e.g., United States/Canada and International). The geographic/national area can be used in parsing the entered phone address and selecting the appropriate gateway (e.g., domestic or international). Optionally instead or in addition, the appropriate gateway is selected by the system by querying one or more databases (e.g., phone number databases such as a local number portability database). A message field is provided via which the user can enter a text message.

A character counter keeps track of the number of characters entered into the text field to aid the user in ensuring that a limit on text message characters (e.g., 160 7-bit characters, 140 8-bit characters, 70 16-bit characters, etc.) is not exceeded. Larger content (e.g., long SMS/concatenated SMS) can be sent segmented over multiple messages. A parts counter keeps track of the number of parts to the SMS message. A send control is provided that, when activated, causes the system to send the message entered by the user. An archive control is provided, which, when activated, causes the display of certain message transactions. For example, the system can display the customer's more recent or all of the customer's message transactions. Optionally, the customer can specify how many and/or the time frame of the displayed transactions. Optionally, the customer can set up a filter to cause the archive user interface to only display message to and/or from certain people.

FIG. 12 illustrates an example user interface for sending SMS messages displayed via a Web page. In this example, a cell number field is provided via which the user can enter the phone number of the user. Optionally, a contacts control is provided which enables the user to select a phone number from a contact database. An optional carrier field is provided via which the user can select the carrier associated with the user's phone. In this example, the user can select a carrier from a drop-down list of carriers. An email field is provided via which the user can enter an email address to which replies to the user's message are to be sent. Check fields are provided via which the user can indicate if replies are to be sent to the email address and/or as an SMS message to the user's phone.

A message field is provided via which the user can enter a text message. A send control is provided that, when activated, causes the system to send the message entered by the user. Optionally, the user interface illustrated in FIG. 12 can include other controls, such as those illustrated in FIG. 9.

While FIGS. 9 and 12 include fields for entering text, optionally instead or in addition, the user may attach other media, such as graphics, audio, pictures, movies, etc. Optionally, the user interface displays a listing of such media, wherein the user can select the desired media to be messaged. Optionally, a browser or search user interface is provided via which the user can search for and select the desired media. Optionally the user may record an image, video, and/or sound of the user or other source (e.g., using a camera, video/sound recorder attached to or included in a phone, computer, or other user terminal) for inclusion in a message.

Figure 10:
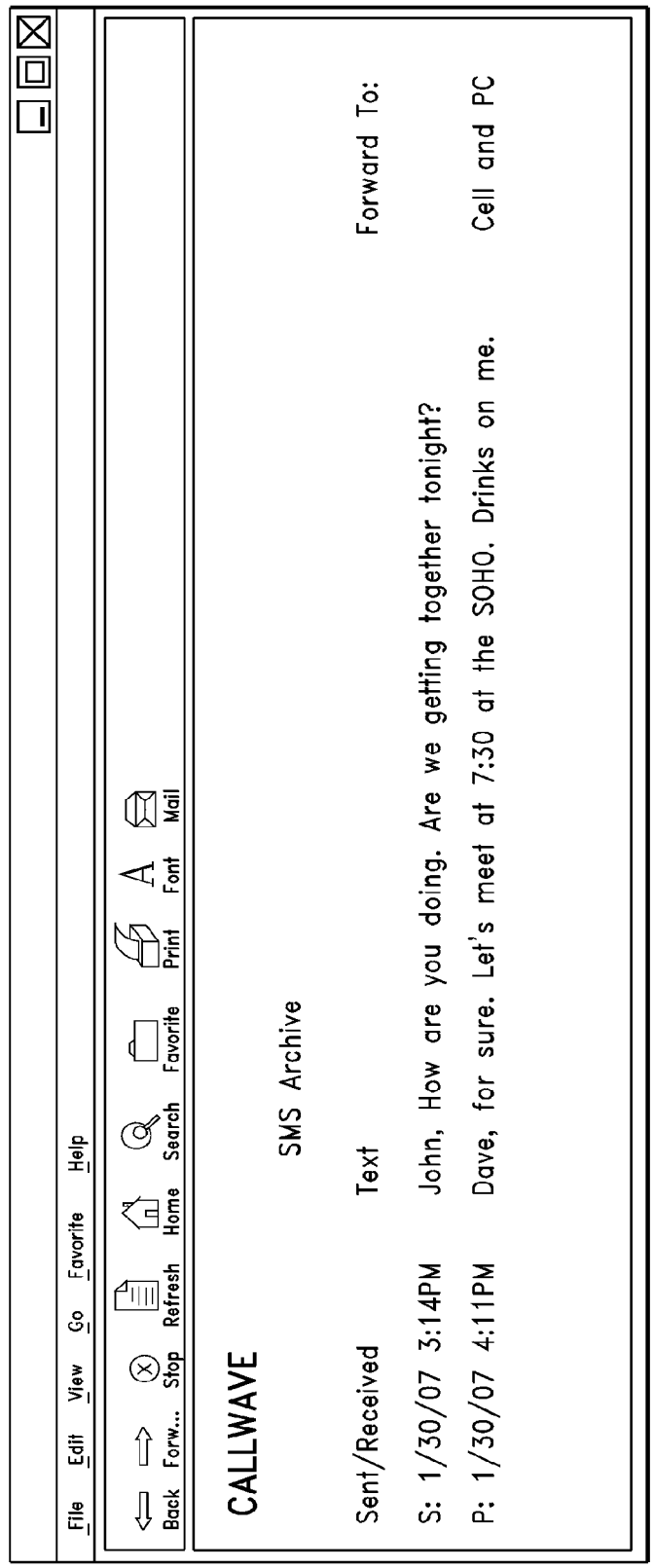
FIG. 10 illustrates an example web-based SMS archive.

FIG. 10 illustrates an example listing of message (e.g., SMS/MMS message) transactions. A first column lists the send or received date and time corresponding to a message, with an indication as to whether the message was sent ("S") or received ("R"). A message field displays some or all of the message (e.g., text or multimedia) optionally via a scrollable interface. A forward column indicates the forwarding destinations, if any for the message.

It should be understood that certain variations and modifications of the systems and processes described herein would suggest themselves to one of ordinary skill in the art. The scope of the present invention is not to be limited by the illustrations or the foregoing descriptions thereof.

What is claimed is:

1. A system, comprising:
   at least one computing device comprising hardware;
   non-transitory memory coupled to the at least one computing device that stores instructions that when executed by the at least one computing device cause, at least in part, the system to perform operations comprising:
   providing a software program to a mobile computing device associated with a user;
   receiving a plurality of calls directed to the mobile computing device associate with the user;
   enabling a user interface of the software program hosted on a the mobile computing device associated with the user to display on the mobile computing device a list of call records corresponding to the plurality of calls;
   receiving, via the user interface of the software program, a selection by the user of a blocking instruction in association with the a call record from the list of call records; and,
   at least partly in response to the receipt of the blocking instruction, recording in memory an indication that future communications, of at least a first type and a second type, be blocked to the mobile computing device associated with the user from a caller corresponding to the user-selected call record from the list of call records.

2. The system as defined in claim 1, wherein the non-transitory memory stores instructions that when executed by the at least one computing device cause, at least in part, the system to perform operations comprising:
   receiving a message directed to the mobile computing device associated with the user from a sender wherein a message address of the received message corresponds to a message address contained in a message address field of the user-selected contact record, which includes a phone address of the caller;
   based at least in part on the message address of the received message, accessing at least the blocking instruction; and
   blocking, by at least one computing device comprising hardware, the received message to the mobile computing device of associated with the user.

3. The system as defined in claim 1, wherein the list of call records comprises answered and not answered calls.

4. The system as defined in claim 1, wherein the first type of future communication comprises a phone call.

5. The system as defined in claim 1, wherein the first type of future communication comprises a message.

6. The system as defined in claim 1, the operations further comprising:
   receiving via the user interface of the software program a selection by the user of an unblocking instruction in association with a contact record;
   receiving an inbound call directed to the mobile computing device associated with the user wherein a phone address of the inbound call corresponds to the phone address contained in the phone address field of the contact record; and
   determining that the inbound call is to be connected to the mobile computing device associated with the user.

7. The system as defined in claim 1, wherein the displayed list of call records includes a call from a private phone address.

8. The system as defined in claim 1, the operations further comprising:
   enabling the user via the user interface of the software program to display a list of currently blocked callers, blocked message senders, or blocked callers and blocked message senders.

9. A method, comprising:
   providing a software program for a mobile computing device associated with a user;
   receiving, at a computer system comprising hardware, a plurality of calls directed to the mobile computing device associate with the user;
   enabling a user interface of the software program hosted on the mobile computing device associated with the user to display on the mobile computing device a list of call records corresponding to the plurality of calls;
   receiving, via the user interface of the software program, at the computer system a selection by the user of a blocking instruction in association with the a call record from the list of call records; and,
   at least partly in response to the receipt of the blocking instruction, recording, by the computer system, in memory an indication that future communications, of at least a first type and a second type, be blocked to the mobile computing device associated with the user from a caller corresponding to the user-selected call record from the list of call records.

10. The method as defined in claim 9, the method further comprising:
    receiving a message directed to the mobile computing device associated with the user from a sender wherein a message address of the received message corresponds to a message address contained in a message address field of the user-selected contact record, which includes a phone address of the caller;
    based at least in part on the message address of the received message, accessing at least the blocking instruction; and
    blocking, by at least one computing device comprising hardware, the received message to the mobile computing device associated with the user.

11. The method as defined in claim 9, wherein the list of call records comprises answered and not answered calls.

12. The method as defined in claim 9, wherein the first type of future communication comprises a phone call.

13. The method as defined in claim 9, wherein the first type of future communication comprises a message.

14. The method as defined in claim 9, the method further comprising:
    receiving via the user interface of the software program a selection by the user of an unblocking instruction in association with a contact record;
    receiving an inbound call directed to the mobile computing device associated with the user wherein a phone address of the inbound call corresponds to the phone address contained in the phone address field of the contact record; and
    determining that the inbound call is to be connected to the mobile computing device associated with the user.

15. The method as defined in claim 9, wherein the displayed list of call records includes a call from a private phone address.

16. The method as defined in claim 9, the method further comprising:
 enabling the user via the user interface of the software program to display a list of currently blocked callers, blocked message senders, or blocked callers and blocked message senders.

* * * * *

UNITED STATES PATENT AND TRADEMARK OFFICE
CERTIFICATE OF CORRECTION

| | | |
|---|---|---|
| PATENT NO. | : 8,774,785 B1 | Page 1 of 1 |
| APPLICATION NO. | : 14/103630 | |
| DATED | : July 8, 2014 | |
| INVENTOR(S) | : Leland W Kirchhoff | |

It is certified that error appears in the above-identified patent and that said Letters Patent is hereby corrected as shown below:

Column 2 (title page 3, item 56) line 37, References Cited, under Other Publications, change "htto://" to --http://--.

In the Specification

Column 2 line 45, Change "services" to --services.--.
Column 4 line 43, Change "blacklist" to --blacklist.--.
Column 5 line 41, Change "blacklist" to --blacklist.--.
Column 9 line 49, After "subsystem.)" delete "!!".
Column 12 line 19, Change "SCCP" to --SCP--.
Column 13 line 6, Change "blacklist" to --blacklist.--.

In the Claims

Column 17 line 26, Claim 1, change "a the" to --the--.
Column 17 line 31, Claim 1, change "the a" to --the--.
Column 17 line 54, Claim 2, after "device" delete "of".
Column 18 line 28, Claim 9, change "the a" to --the--.

Signed and Sealed this
Seventeenth Day of February, 2015

Michelle K. Lee
*Deputy Director of the United States Patent and Trademark Office*